United States Patent

Ebihara

[11] Patent Number: 5,848,197
[45] Date of Patent: Dec. 8, 1998

[54] IMAGE PICKUP SYSTEM FOR OBTAINING FLAT IMAGE WITHOUT DISTORTION

[75] Inventor: Toshiyuki Ebihara, Tokyo, Japan

[73] Assignee: Olympus Optical Co., Ltd., Tokyo, Japan

[21] Appl. No.: 779,058

[22] Filed: Jan. 6, 1997

Related U.S. Application Data

[63] Continuation of Ser. No. 397,721, Mar. 2, 1995, abandoned, which is a continuation of Ser. No. 53,879, Apr. 27, 1993, abandoned.

[30] Foreign Application Priority Data

Apr. 28, 1992 [JP] Japan ..... 4-109733

[51] Int. Cl.⁶ ..... G06K 9/40
[52] U.S. Cl. ..... 382/275; 382/156; 382/293; 382/300
[58] Field of Search ..... 382/198, 204, 382/259, 254, 156, 159, 155, 300, 293

[56] References Cited

U.S. PATENT DOCUMENTS

| | | | |
|---|---|---|---|
| 3,624,606 | 11/1971 | Lefevre | 382/54 |
| 4,805,225 | 2/1989 | Clark | 382/161 |
| 4,850,026 | 7/1989 | Jeng et al. | 382/185 |
| 5,018,215 | 5/1991 | Nasr et al. | 382/155 |
| 5,023,917 | 6/1991 | Bose et al. | 358/106 |
| 5,048,102 | 9/1991 | Tararine et al. | 382/44 |
| 5,063,604 | 11/1991 | Weiman | 382/170 |
| 5,159,667 | 10/1992 | Borrey et al. | 395/148 |
| 5,175,808 | 12/1992 | Sayre | 382/44 |
| 5,193,124 | 3/1993 | Subbarao | 382/41 |
| 5,208,872 | 5/1993 | Fisher | 382/54 |
| 5,231,673 | 7/1993 | Elenga | 382/54 |
| 5,267,332 | 11/1993 | Walch et al. | 382/198 |
| 5,276,530 | 1/1994 | Siegel | 358/452 |
| 5,355,420 | 10/1994 | Bloomberg et al. | 382/155 |
| 5,361,386 | 11/1994 | Watkins et al. | 395/130 |
| 5,485,531 | 1/1996 | Ichinohe et al. | 382/198 |

FOREIGN PATENT DOCUMENTS 0 383 360  8/1990  European Pat. Off. ..... 382/155

OTHER PUBLICATIONS

Goodman et al. "Algorithm programmed by a neural network model for Coordinate Transformation", IJCNN IEEE Cat#90CH2879-5 pp. 381–386 vol. 2 Jun. 1990.

*Primary Examiner*—Michael Razavi
*Assistant Examiner*—Jayanti K. Patel
*Attorney, Agent, or Firm*—Frishauf, Holtz, Goodman, Langer & Chick

[57] ABSTRACT

An image reading unit picks up an image to convert the image into an electric signal. An A/D converter converts the electric signal into a digital signal, and an input image memory stores the digital signal. An image reduction processing unit reduces the image data stored in the input image memory. A reduced image memory stores the reduced image. A control point coordinate generating unit reads out the image stored in the reduced image memory to detect distortion. An image converter corrects distortion of the image data loaded from the input image memory on the basis of the information of the detected distortion. The image data whose distortion is corrected is stored in a corrected image memory. The image data whose distortion is corrected and which is stored in the corrected image memory is read out and recorded, so that when an image pickup operation of characters having distortion is to be performed, the distortion is corrected to obtain a flat image, free from distortion, like an image on a flat surface.

13 Claims, 13 Drawing Sheets

F I G. 1

F I G. 2

▨ PIXEL HAVING CHARACTER

THIS IS A DOCUMENT IMAGE.

THIS IS A DOCUMENT

IMAGE. THIS IS A DOCU-

MENT IMAGE. THIS IS A

DOCUMENT IMAGE. THIS IS A

IMAGE PICKUP SYSTEM FOR OBTAINING FLAT IMAGE WITHOUT DISTORTION

This application is a Continuation, of application Ser. No. 08/397,721, filed Mar. 2, 1995, which is a Continuation of application Ser. No. 08/053,879 filed Apr. 27, 1993 now both abandoned.

BACKGROUND OF THE INVENTION

1. Field of the Invention

The present invention relates to an image pickup system and, more particularly, to an image pickup system for obtaining a flat image without distortion.

2. Description of the Related Art

As a typical example of conventional image fetching apparatuses, a xerography using an electrophotographic technique is known.

In this technique, a photoconductive body is used for forming a latent image, charges are generated on the photoconductive body surface by corona charging. The image of an original set on an original table is formed on the photoconductive body surface, and the electric resistance of the photoconductive body is decreased to remove the charges on a non-image line portion, thereby forming a latent image.

The original table is generally made of a transparent material such as glass. The original is set to face down, and the original is read from its lower surface through the original table.

On the photoconductive body surface, charges are left on a portion where the image of the image line portion of the original is formed. In the next developing process, a toner is attracted to the image line portion by a Coulomb force, the latent image is developed, and the attracted toner is transferred to paper. Since this toner is heat-fusible, it is melted by heating and is fixed by cooling to room temperature. In this manner, the copy of the image of the original is formed on the paper.

On the other hand, some image fetching apparatuses use line sensors or area sensors.

A typical image fetching apparatus using a line sensor is an image scanner. In the image scanner, an object to be copied is placed on the surface of a glass plate, and an image pick-up operation is sequentially performed in a main scanning direction while the line sensor is moved on the lower surface of the glass plate in a sub-scanning direction, thereby obtaining flat image data.

A typical image fetching apparatus using an area sensor is an electronic still camera. In this electronic still camera, an object to be photographed is picked up at once by using the area sensor, thereby obtaining flat image data.

In such a conventional image fetching apparatus, when an original is not in tight contact with an original table, for example, although intervals between characters of the original are uniform on the original, the intervals between characters on a copy may be disadvantageously narrowed, or lines of the characters on the copy may be disadvantageously curved.

For example, when a spread of a thick tight-back book is to be copied, the gutter portion of the center of the book is not in tight contact with the original table due to the large thickness of the book, and the distance between the gutter portion and an image pickup apparatus is not kept constant, thereby distorting copied characters.

SUMMARY OF THE INVENTION

It is, therefore, an object of the present invention to provide a new and improved image pickup system in which an image to be picked up as characters distorted by a curved surface, can be corrected to obtain a flat image, like an image on a flat surface, without distortion.

According to one aspect of the present invention, there is provided an image pickup apparatus which includes image pickup means for picking up a target image to output an electric signal. A converting means is provided for converting the electric signal received from the image pickup means into a digital signal to output image data. A distortion detecting means detects distortion information about the image data received from the converting means. A control point coordinates generating means generates coordinates of a predetermined number of control points in accordance with the distortion information about the image data detected by said distortion detecting means. A distortion correcting means corrects distortion of the image data from the converting means by position-converting the image data in accordance with the control point coordinates generated by the control point coordinates generating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

Several embodiments of the present invention will be described below with reference to the accompanying drawings.

Figure 1:
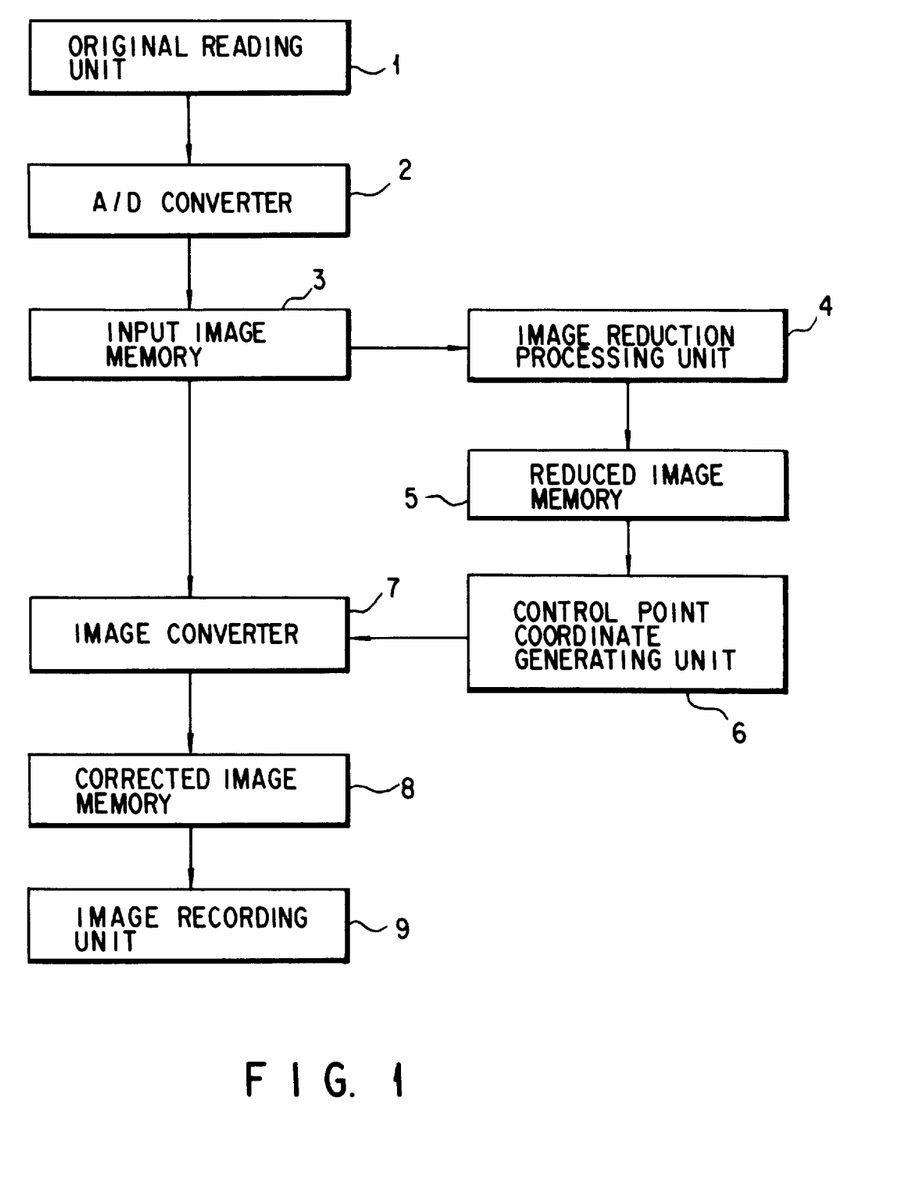
FIG. 1 is a view showing the arrangement of an image reading apparatus according to the first embodiment of the present invention.

FIG. 1 is a block diagram showing the arrangement of the first embodiment of the present invention.

As shown in FIG. 1, an original reading unit 1 is connected to an input image memory 3 through an analog/digital (A/D) converter 2, and the input image memory 3 is connected to an image reduction processing unit 4 and an image converter 7. The image reduction processing unit 4 is connected to a reduced image memory 5, and the reduced image memory 5 is connected to a control point coordinate generating unit 6.

The control point coordinate generating unit 6 is connected to the image converter 7, and the image converter 7 is connected to a corrected image memory 8. The corrected image memory 8 is connected to an image recording unit 9.

In the above arrangement, when the density of an original is converted by the original reading unit 1 into an electric signal, density information of the original converted into the electric signal is converted into a digital signal by the A/D converter 2, and the digital signal is stored in the input image memory 3. Image data stored in the input image memory 3 is reduced by the image reduction processing unit 4, and the reduced image data is stored in the reduced image memory 5.

In the above state, the image data stored in the reduced image memory 5 is read out by the control point coordinate generating unit 6, and distortion of the image data is analyzed. For example, x- and y-coordinates of each of 16 control points corresponding to the state of distortion are calculated. The control points are used for converting an image, and are formed at positions reflecting the distortion in the image data. In this embodiment, conversion in which the positions of the control points are moved to regularly arranged positions is performed to correct the distortion of the image.

The x- and y-coordinate data of the 16 control points calculated by the control point coordinate generating unit 6 are output to the image converter 7. In the image converter 7, the distortion of the image data loaded from the input image memory 3 is corrected on the basis of the coordinate data, and the image data whose distortion is corrected is written in the corrected image memory 8.

In this manner, the image data whose distortion is corrected is read out from the corrected image memory 8 by the image recording unit 9, and the image is copied and recorded on, e.g., paper.

A method of correcting the distortion of the image data will be described below.

Figure 2:
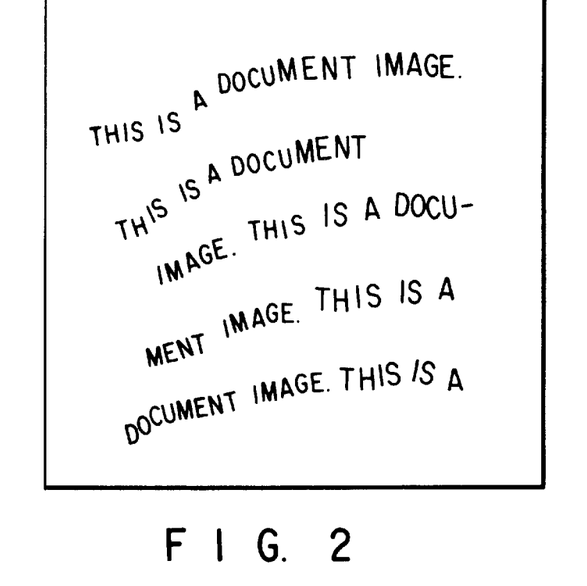
FIG. 2 is a view illustrating an image recorded in an input image memory 3 in FIG. 1.

FIG. 2 illustrates image data recorded in the input image memory 3 when an image is picked up with distortion. In this case, the number of pixels is 1,024×1,024. The image data is reduced by the image reduction processing unit 4 and then stored in the reduced image memory 5. The number of pixels of the reduced image data is 24×24.

Figure 3:
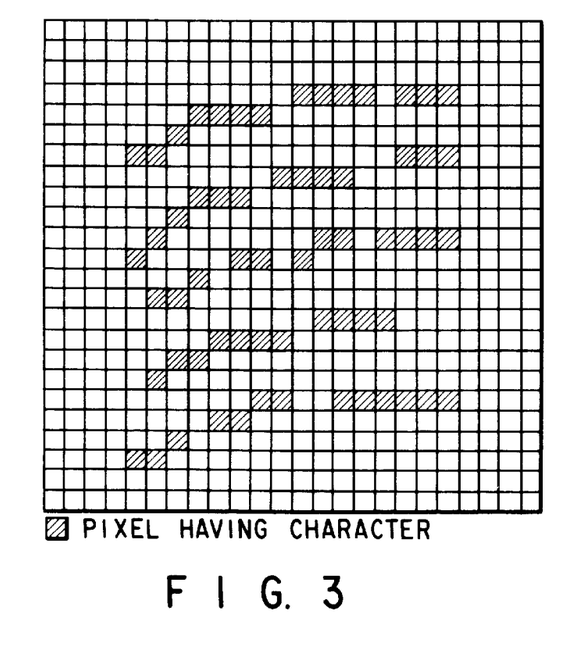
FIG. 3 is a view illustrating an image reduced by an image reduction processing unit 4 and stored in a reduced image memory 5.

FIG. 3 is a view illustrating the image data stored in the reduced image memory. In FIG. 3, pixels indicated by hatched lines include character images, i.e., each of these pixels is obtained by reducing a pixel having a complete character image before the reduction processing is performed. The pixels are almost continuously shown along the arrangement of the character images obtained before the reduction processing is performed.

Figure 4A:
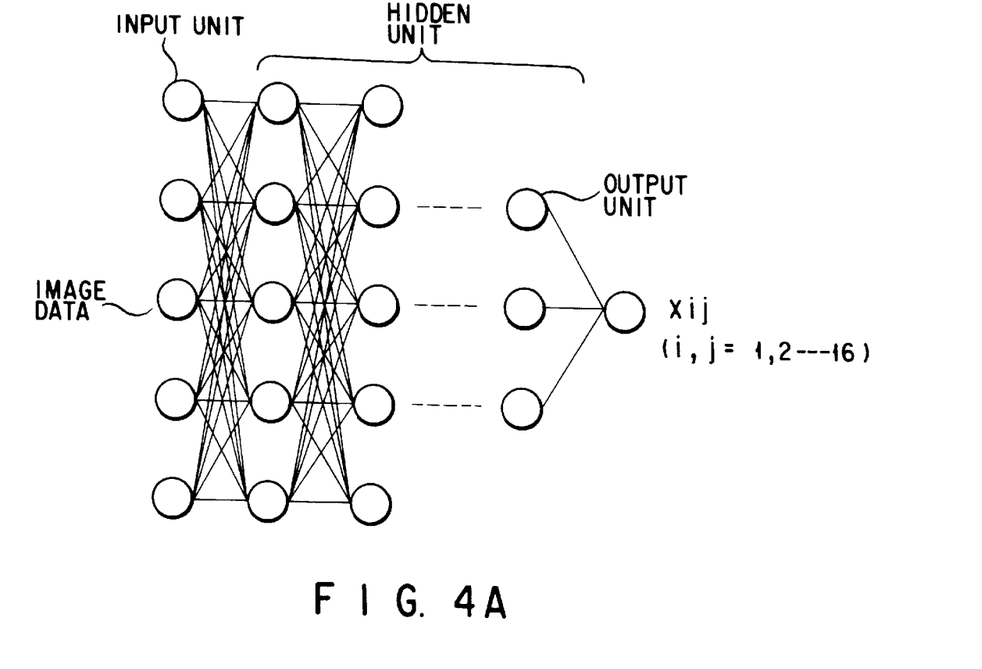
FIGS. 4A and 4B are views showing neural networks constituting a control point coordinate generating unit 6.
Figure 4B:
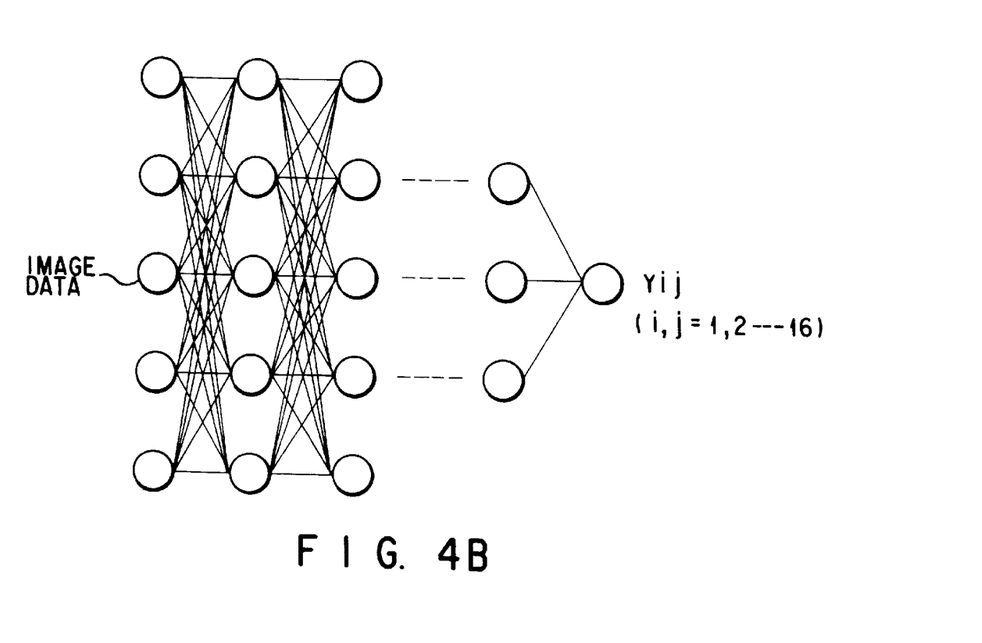

FIGS. 4A and 4B are views showing neural networks constituting the control point coordinate generating unit 6. One set of neural networks is constituted by a neural network (FIG. 4A) for outputting the x-coordinate of a control point and a neural network (FIG. 4B) for outputting the y-coordinate of a control point, and the number of sets is equal to the number of control points. One neural network is in charge of one coordinate.

For example, when the number of control points is set to be 16, 32 neural networks are required. When the 16 control points are represented by P1, P2, P3, . . . , P16, the first neural network outputs the x-coordinate data of P1, the second neural network outputs the y-coordinate data of the P1. The third neural network outputs the x-coordinate data of P2, and the fourth neural network outputs the y-coordinate data of P2.

Reduced image data is input to an input unit of a neural network.

Although only five input units are shown in FIG. 4, in fact each neural network has the input units of the number equal to the number of pixels of the reduced image data, i.e., 24×24.

The neural networks are caused to learn in advance. When the neural networks receive image data, the neural networks generate control points at positions corresponding to the distortion of the image data. The above learning process is performed by back propagation error learning or the like.

That is, a plurality of image data whose distortions are known in advance are combined to the coordinate (x or y) data of the control points Pi (i=1, 2, . . . , 16) reflecting the distortion of the image data, and the combined data is repeatedly input to the neural networks, thereby causing the neural networks to learn.

A method of calculating a distorted image and the coordinates of control points will be described below.

Figure 5A:
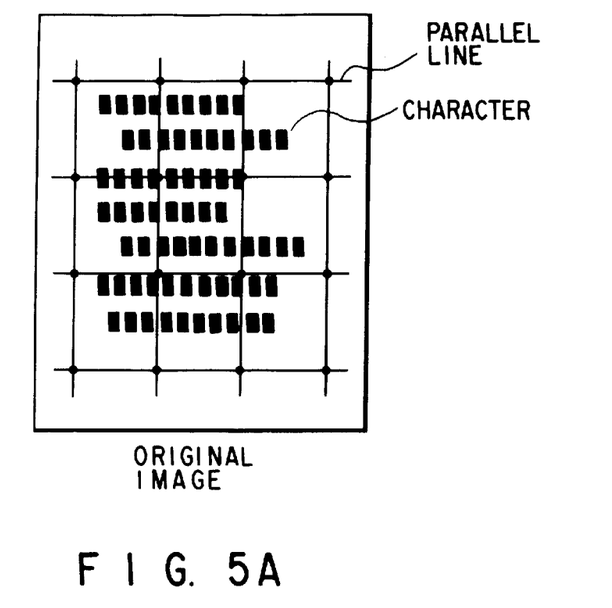
FIG. 5A is a view showing an image in which four vertical parallel lines and four horizontal parallel lines are imaginally drawn at equal intervals on an original image before distortion.

As shown in FIG. 5A, four vertical parallel lines and four horizontal parallel lines are imaginally drawn at equal intervals on an original image before distortion so that their intersections form a matrix pattern. These parallel lines cross each other at 16 points. The parallel lines are drawn such that a region surrounded by the 16 cross points covers a region of the original. Although the parallel lines are only imaginally drawn, they are not actually drawn on the image input to the neural networks.

Figure 5B:
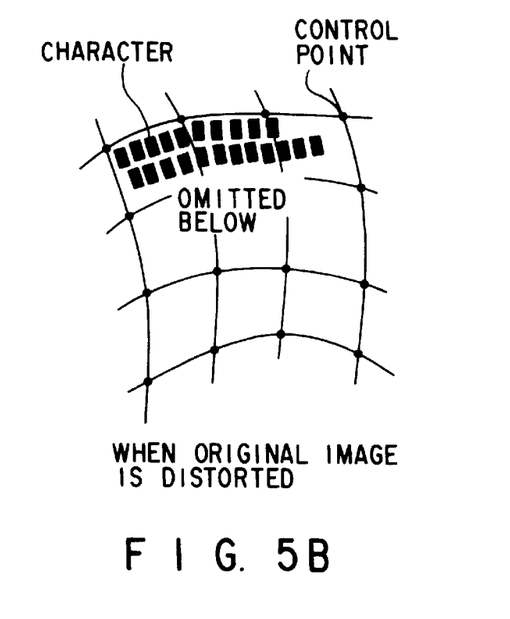
FIG. 5B is a view showing an image obtained by arbitrarily distorting the image shown in FIG. 5A.

As shown in FIG. 5B, the image is distorted by arbitrary deformation.

At this time, the image is arbitrarily distorted. The distorted image is reduced with the same characteristics as those of the image reduction processing unit 4. The reduced image is input to the neural networks.

The coordinates of the control points represent 16 coordinate points obtained by causing the distorted parallel lines to cross. That is, the coordinates of the control points are coordinates of positions obtained such that the coordinates uniformly arranged at predetermined intervals on the original image before distortion are moved by distortion.

Figure 6:
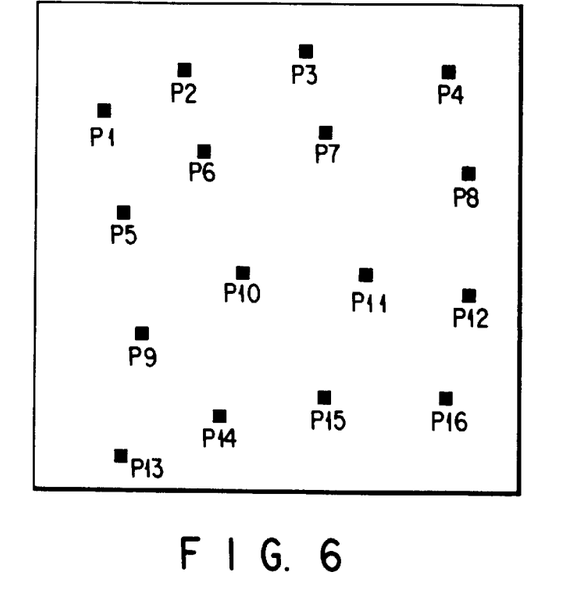
FIG. 6 is a view showing the coordinates of control points in a reduced image stored in the reduced image memory 5 in FIG. 1.

When reduced image data as shown in FIG. 3 is input to the neural networks which are caused to learn, the coordinates of the control points indicated by black points in FIG. 6 are output. The points are represented by P1, P2, P3, . . . , P16, respectively as shown in FIG. 6.

Figure 7:
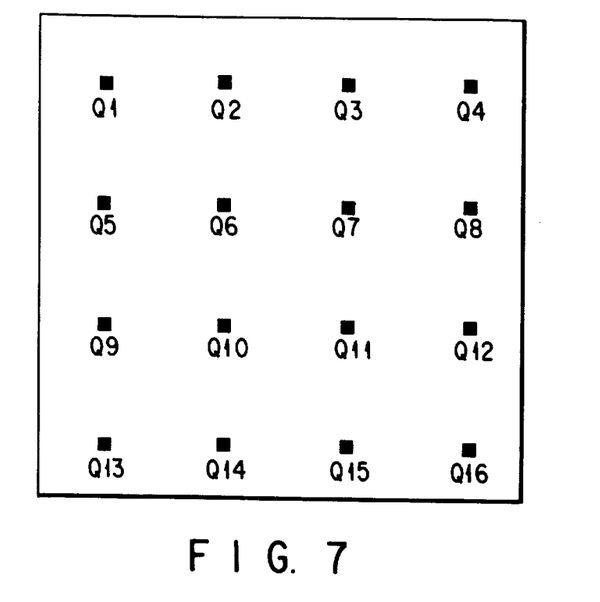
FIG. 7 is a view showing lattice points set by a corrected image memory 8.

Lattice points are set in the corrected image memory 8 and are defined as Q1, Q2, Q3, . . . , Q16 as shown in FIG. 7.

The image converter 7 refers to the coordinates of the control points, and writes image data located at the positions P1, P2, P3, . . . , P16 of the input image memory 3 at positions corresponding to Q1, Q2, Q3, . . . , Q16 of the corrected image memory 8. In the corrected image memory 8, interpolation is performed on the basis of the image data located at the positions P1, P2, P3, . . . , P16 of the input image memory 3 to calculate corresponding values, and the resultant values are written at the positions of pixels located between the positions Q1, Q2, Q3, . . . , Q16 of the corrected image memory 8.

Although the interpolation is performed by various methods, for example, the following method is preferably used.

Figure 8A:
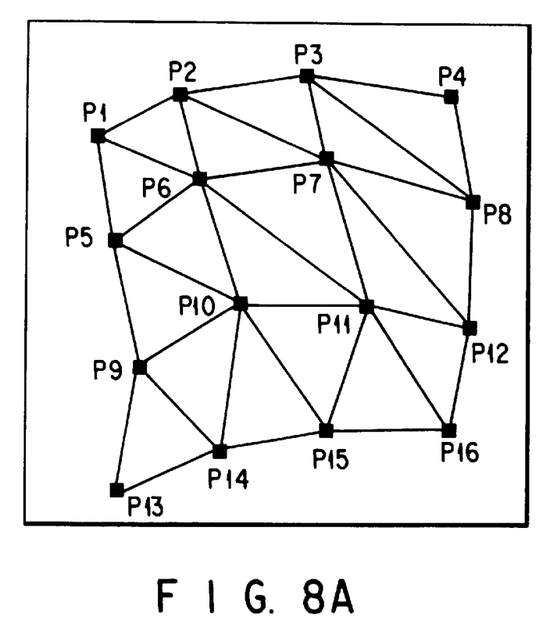
FIGS. 8A and 8B are views showing areas of image memories divided into small triangular areas by the control points and the lattice points.
Figure 8B:
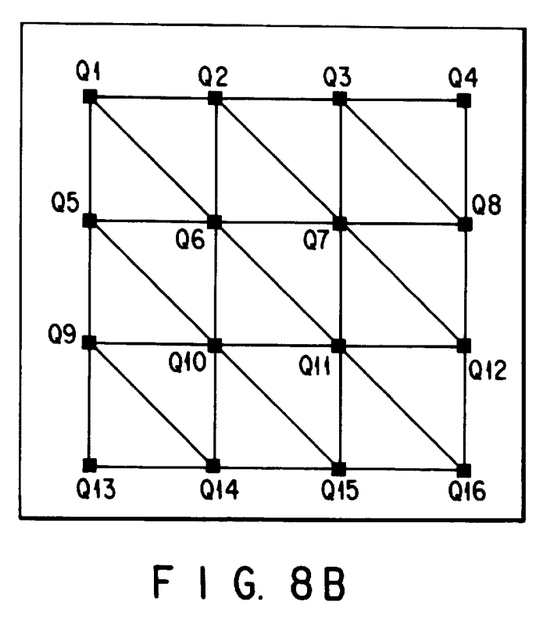

That is, as shown in FIGS. 8A and 8B, the area of the image memory is divided into small triangular areas formed by the control points and lattice points. It is important that a pixel corresponding to an image at an arbitrary position in FIG. 8B is searched from the memory area in FIG. 8A.

Figure 9A:
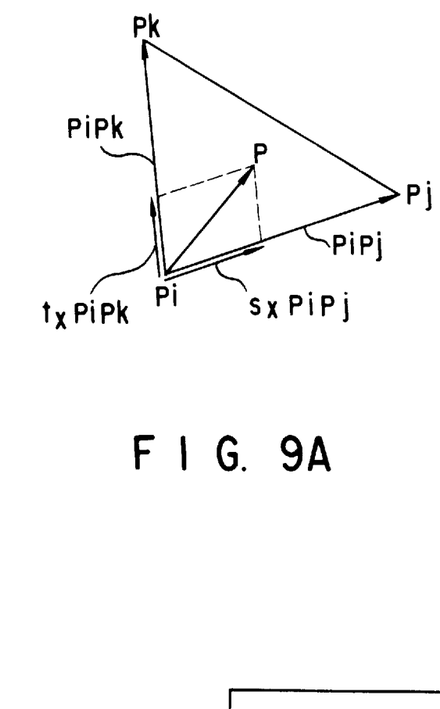
FIG. 9A is a view showing a triangle extracted from the triangles shown in FIG. 8A.
Figure 9B:
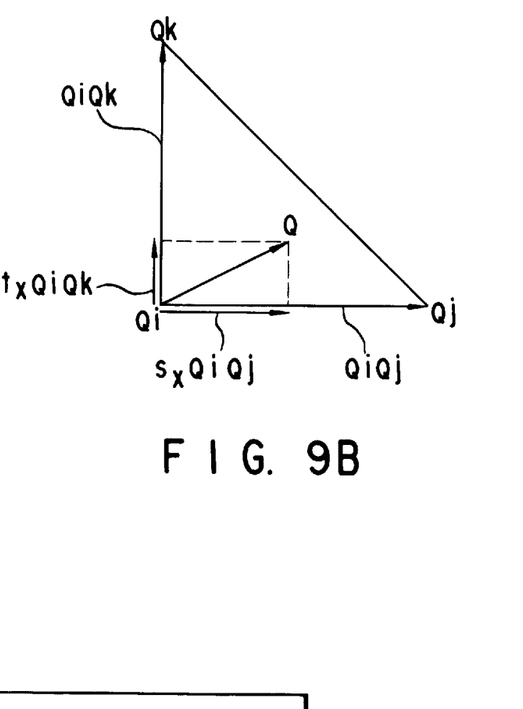
FIG. 9B is a view showing a triangle extracted from the triangles shown in FIG. 8B.

FIG. 9B shows one triangle extracted from the triangles in FIG. 8B.

When a pixel located inside the triangle is represented by Q, a vector QiQ can be expressed by the linear combination of a vector QiQj and a vector QiQk. When coefficients of the vectors QiQj and QiQk are represented by s and t, respectively, the vector QiQ can be expressed as follows:

$$QiQ = s \times QiQj + t \times QiQk$$

When this equation is expressed by components, simultaneous linear equations concerning s and t can be obtained. For this reason, s and t can be calculated by solving the simultaneous linear equations concerning s and t.

On the other hand, FIG. 9A shows a triangle in FIG. 8A corresponding to the triangle of FIG. 9B. A pixel P defined by the following equation is calculated by using s and t calculated by the above method.

$$PiP = s \times PiPj + t \times PiPk$$

In this manner, the pixel P is necessarily defined in correspondence with the pixel Q. Therefore, the data value of the pixel P is preferably given to the pixel Q.

Figure 10:
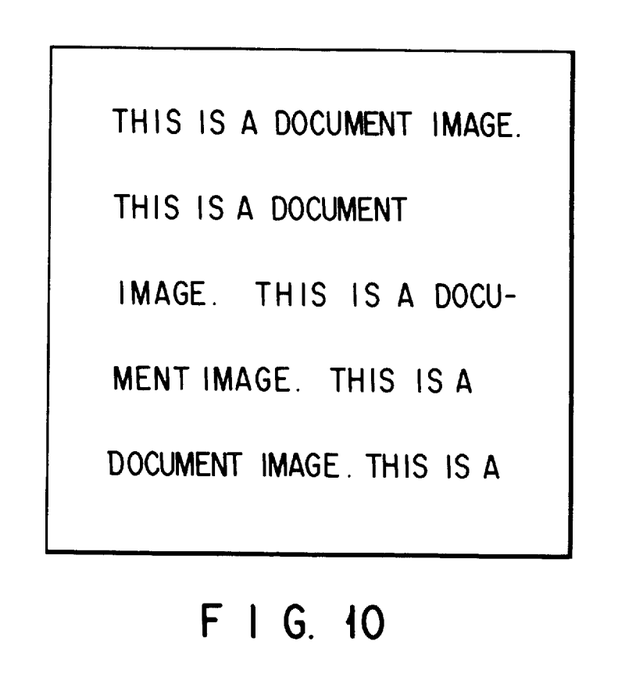
FIG. 10 is a view showing a distortion-corrected image having a uniform character arrangement.

When the image data of all the pixels of the corrected image memory 8 are calculated by the interpolation described above, a distortion-corrected image having a uniform character arrangement is completed as shown in FIG. 10.

In this embodiment, although the parallel lines are imaginally drawn at equal intervals on the original image before distortion, the intervals may arbitrarily be set. For example, when the intervals are set to be decreased at a peripheral portion where an image may largely be distorted, distortion can be corrected more effectively using the same number of control points.

Figure 17:
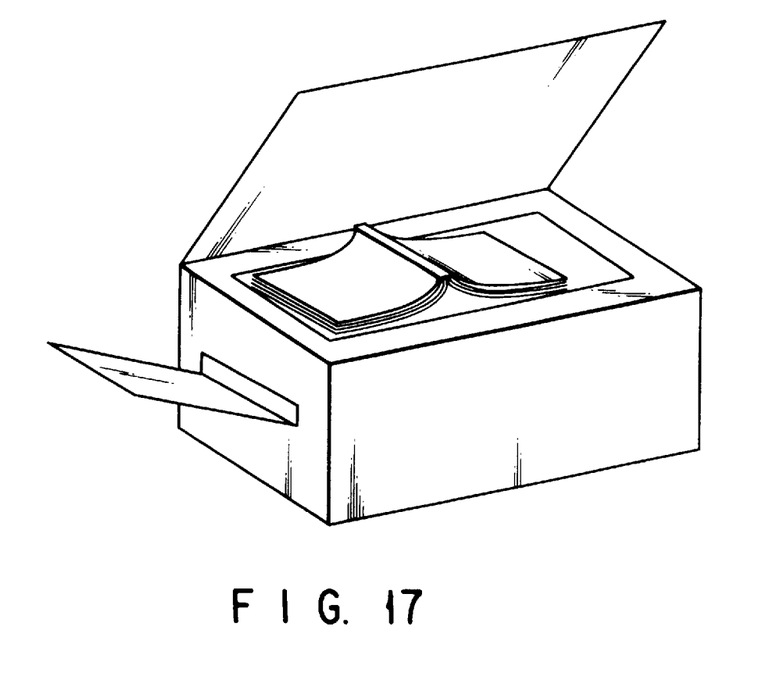
FIG. 17 is a view showing the outer appearance of a copying machine to which the present invention is applied.
Figure 18:
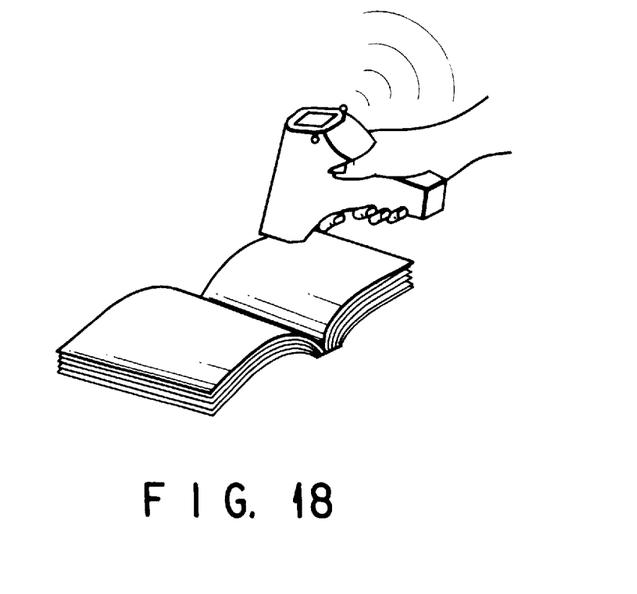
FIG. 18 is a view showing the appearance of an electronic camera to which the present invention is applied.

In this embodiment, although a scheme of reading an original facing down on an original table as in a normal copying machine shown in FIG. 17 is assumed, a remote image pickup operation of the original image may be performed by an electronic camera as shown in FIG. 18.

Figure 11:
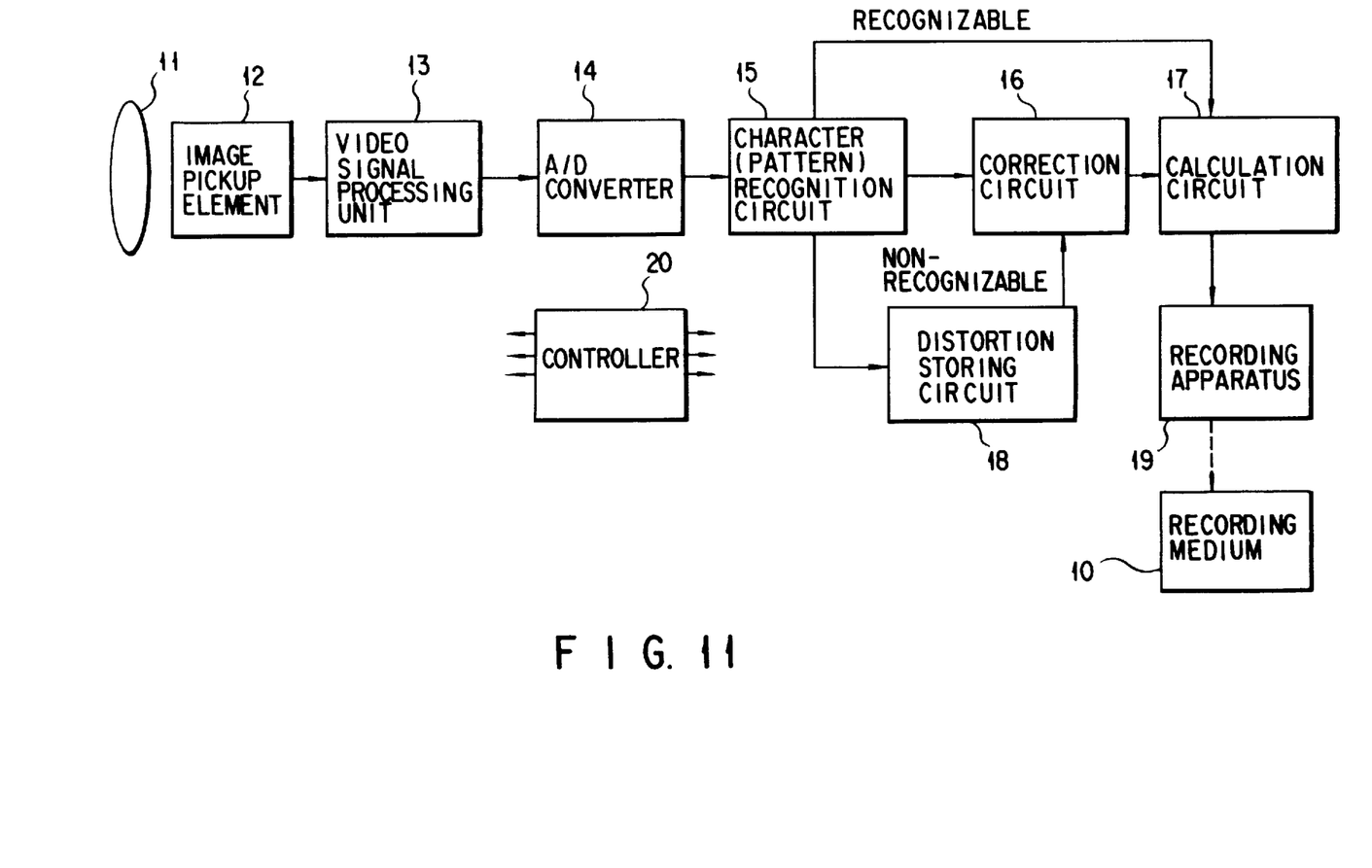
FIG. 11 is a block diagram showing an image fetching apparatus according to the second embodiment of the present invention.

FIG. 11 is a view showing the arrangement of an image fetching apparatus according to the second embodiment of the present invention.

As shown in FIG. 11, an image pickup element 12 is arranged at a position opposite to a lens 11, and the image pickup element 12 is connected to a video signal processing unit 13. The video signal processing unit 13 is connected to an A/D converter 14, and the A/D converter 14 is connected to a character (pattern) recognition circuit 15.

The character (pattern) recognition circuit 15 is connected to a correction circuit 16, a calculation circuit 17, and a distortion storing circuit 18, and the distortion storing circuit 18 is connected to the correction circuit 16. The correction circuit 16 is connected to the calculation circuit 17, and the calculation circuit 17 is connected to a recording apparatus 19.

In the above arrangement, when the image pickup element 12 receives an optical signal focused by the lens 11, the image pickup element 12 converts the optical signal into an electric signal. The video signal processing unit 13 performs processing such as white balance adjustment and γ correction to the image signal converted into the electric signal. The image signal subjected to the above processing is converted from an analog signal to a digital signal by the A/D converter 14, and the digital data is output to the character (pattern) recognition circuit 15 as image data.

In the character (pattern) recognition circuit 15, degrees of similarity between, e.g., a character pattern in input image data and a plurality of character pattern candidates stored in the character (pattern) recognition circuit 15 in advance are calculated by pattern matching, and a character pattern candidate having the maximum similarity is determined and output as a final character (pattern) recognition result, thereby performing character (pattern) recognition.

In the character (pattern) recognition circuit 15, assume that neural networks are combined to each other, and that an error occurs in the recognition result of an input character pattern accordingly. In this case, when the neural networks and weighting coefficients are corrected such that a correct character pattern candidate is obtained in the next character recognition of the input character pattern, the character (pattern) recognition can be stably performed.

In the character (pattern) recognition circuit 15, data recognized as predetermined characters (patterns) are output to the calculation circuit 17, and data which are not recognized as the predetermined characters (patterns) are output to the correction circuit 16. A distortion information signal obtained by the character (pattern) recognition, i.e., information indicating a degree of distortion of an input character (pattern) in a specific direction with respect to the recognized character (pattern), is stored in the distortion storing circuit 18 simultaneously with predetermined character (pattern) position information.

In this embodiment, an object subjected to an image pickup operation is given as a spread of a book when character (pattern) recognition is to be performed to obtain distortion information. On the spread of the book, distortion mainly occurs at the central portion of the spread near the binding margin of the book. In addition, the distortion occurs in only a direction of opening the book.

For this reason, in the character (pattern) recognition, highly accurate recognition is performed at a portion near the central portion of the book, and relatively low accurate recognition is performed at the peripheral portion of the book having small distortion, or character (pattern) recognition is performed in only a predetermined direction, thereby reducing the circuit scale.

In the correction circuit 16, data which is sent to the correction circuit 16 and is not subjected to character (pattern) recognition is corrected on the basis of the information stored in the distortion storing circuit 18 such that a distortion information component stored near the non-recognized data is canceled.

More specifically, when the data which is not subjected to the character (pattern) recognition is sent to the correction circuit 16, the spatial position of the data is calculated by the correction circuit 16. This can easily be calculated by a pixel position in the image pickup operation.

A character which is subjected to the character (pattern) recognition and located near the calculated spatial position is extracted.

At this time, the number of extracted characters is not limited to one, but a plurality of characters may be extracted. In addition, the plurality of extracted characters may be preferably weighted in accordance with distances between the extracted characters and the position of the data which is not subjected to the character recognition.

For one or more characters (patterns) extracted above, distortion information signals obtained in recognition of the characters (patterns) are read out from the distortion storing circuit 18. When the distortion information signals are added to or multiplied with the data which is not subjected to the character (pattern) recognition, the distortion is corrected.

In the calculation circuit 17, the data subjected to character (pattern) recognition and the data which is not subjected to character (pattern) recognition and whose distortion is corrected on the basis of the distortion information signal are added to each other, and the sum is output to the recording apparatus 19 as image data capable of obtaining a flat image without distortion. The image data is recorded on a recording medium 10 such as a floppy disk or a memory card. At this time, the recording apparatus 19 can directly output corrected image data to a printer. Note that all the above operations are controlled by a controller 20 (this also applies to the third and fourth embodiments to be described later).

In this embodiment, although an area sensor is used as the image pickup element 12, a scanner using a line sensor may be used as the image pickup element 12.

Figure 12:
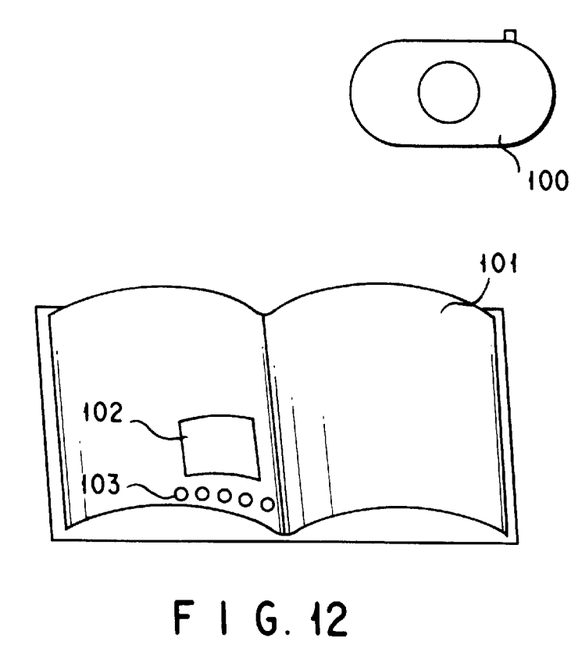
FIG. 12 is a view showing an application of the second embodiment.

FIG. 12 is a view showing an application of the second embodiment. In FIG. 12, reference numeral 100 denotes an image fetching apparatus such as an electronic still camera; 101, an open book; 102, a photograph at the central portion of the book; and 103, an explanation for the photograph or the like.

As shown in FIG. 12, the book 101 has the photograph 102 at its central portion, and the photograph and characters therearound are curved. For this reason, an image obtained such that the image fetching apparatus 100 performs a normal image pickup operation to the book 101 has distortion.

According to the second embodiment, the distortion of the image data can be eliminated.

Figure 13:
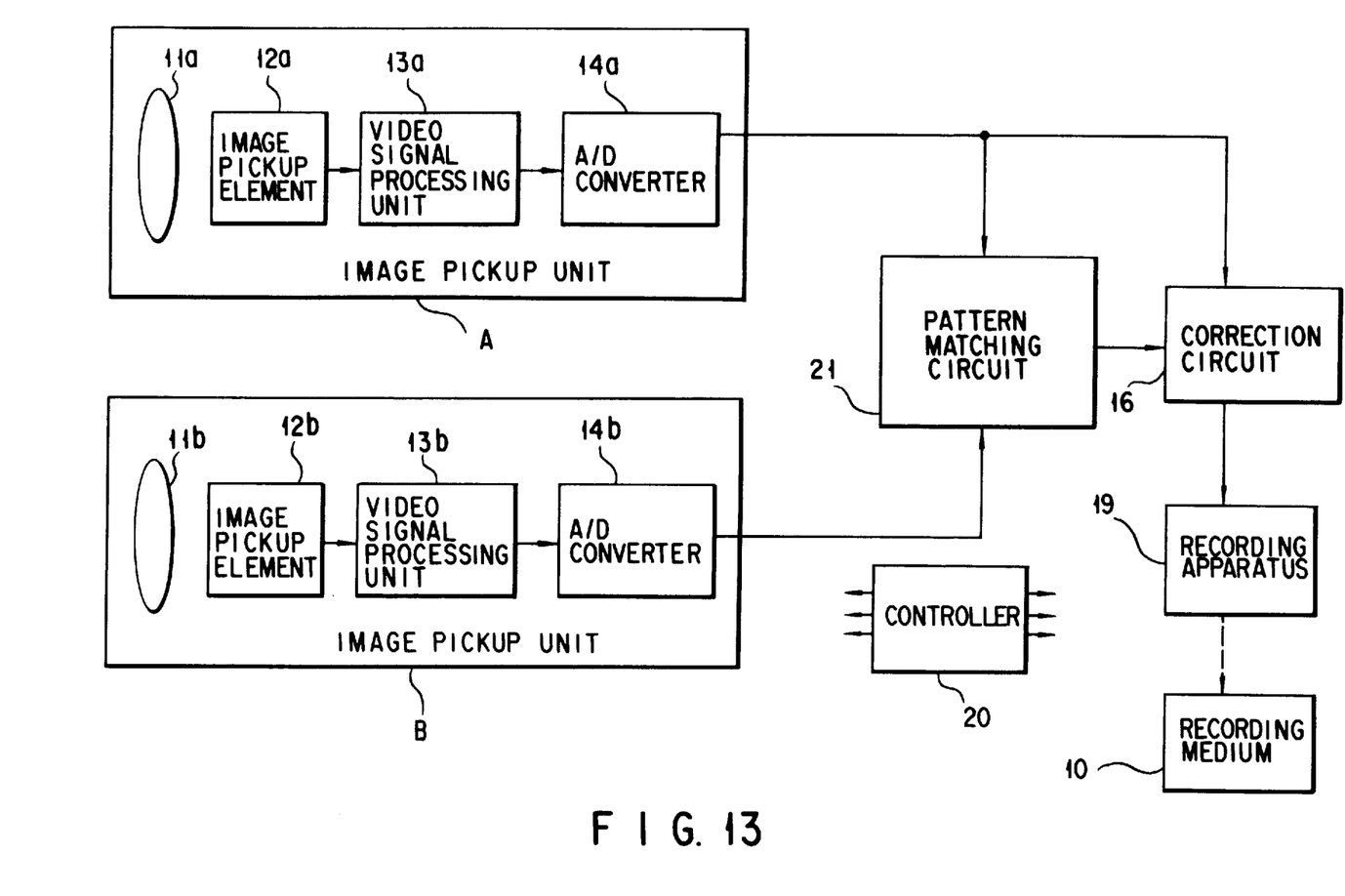
FIG. 13 is a block diagram showing an image fetching apparatus according to the third embodiment of the present invention.

FIG. 13 is a block diagram showing an image fetching apparatus according to the third embodiment of the present invention. Note that the application of this embodiment is the same as that shown in FIG. 12.

As shown in FIG. 13, in an image pickup unit A, an image pickup element 12a is arranged at a position opposite to a lens 11a. A video signal processing unit 13a is connected to the image pickup element 12a, and the video signal processing unit 13a is connected to an A/D converter 14a.

Similarly, in an image pickup unit B, an image pickup element 12b is arranged at a position opposite to a lens 11b. A video signal processing unit 13b is connected to the image pickup element 12b, and the video signal processing unit 13b is connected to the A/D converter 14b.

The output terminals of the image pickup unit A and the image pickup unit B are connected to a pattern matching circuit 21, and the pattern matching circuit 21 is connected to a correction circuit 16. The correction circuit 16 is connected to a recording apparatus 19. An output from the image pickup unit A (or the image pickup unit B) is supplied to the correction circuit 16.

In the above arrangement, image data obtained by image pickup operations of the image pickup units A and B are output to the pattern matching circuit 21.

Note that the image pickup units A and B are arranged to be separated from each other by a predetermined distance.

Figure 14A:
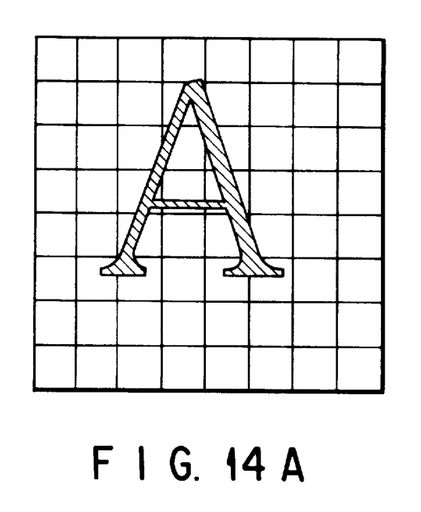
FIGS. 14A and 14B are views showing images picked up by image pickup units A and B in FIG. 13, respectively.
Figure 14B:
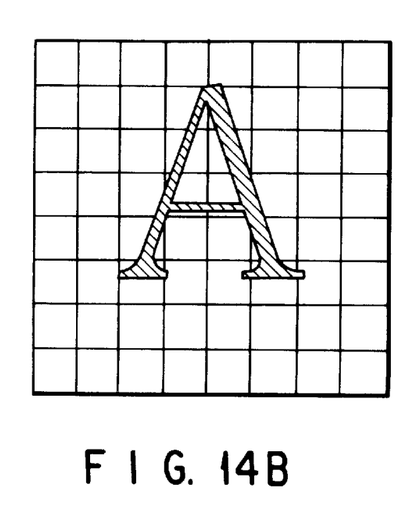

In the pattern matching circuit 21, each of data obtained by picking up a character image "A" by the image pickup units A and B is divided into a plurality of blocks as shown in FIGS. 14A and 14B. At the same time, the correlation between each block and each data obtained by picking up the character image "A" by the image pickup units A and B is calculated, and coordinates having the maximum correlation value are calculated.

In addition, in the pattern matching circuit 21, a shift amount for each block of the image picked up by the image pickup units A and B is calculated by the coordinates having the maximum correlation value for each block obtained by dividing the character image "A".

At the same time, a distance between the image pickup units and the block portion of the object to be photographed is calculated on the basis of the shift amounts of the blocks and the interval between the image pickup units A and B. In this manner, the distances between the image pickup units and the blocks can be obtained, and on the basis of the distance information, the correction circuit 16 performs distortion correction (to be described later) to image data output from the image pickup unit A or B.

In the correction circuit 16, the following processing is performed. That is, when an object to be photographed has a flat surface, the distance between the image pickup unit and each block of the object has a predetermined value set for each block. However, when an object has a curved surface, the distance between the image pickup unit and each block changes. The changing distance is the distance calculated by the above pattern matching. It is checked whether the calculated distance is longer or shorter than the distance obtained when the object has a flat surface. If the calculated distance is longer, the image data of a block having the calculated distance is enlarged in proportion to the distance. If the calculated distance is shorter, the image data is reduced. In this manner, distortion caused by the change in distance is corrected.

The image data whose distortion is corrected is recorded on a recording medium 10 by the recording apparatus 19. At this time, when the unit of recording which is smaller than the number of blocks is used, an influence of block distortion caused by block formation can be suppressed.

Figure 15:
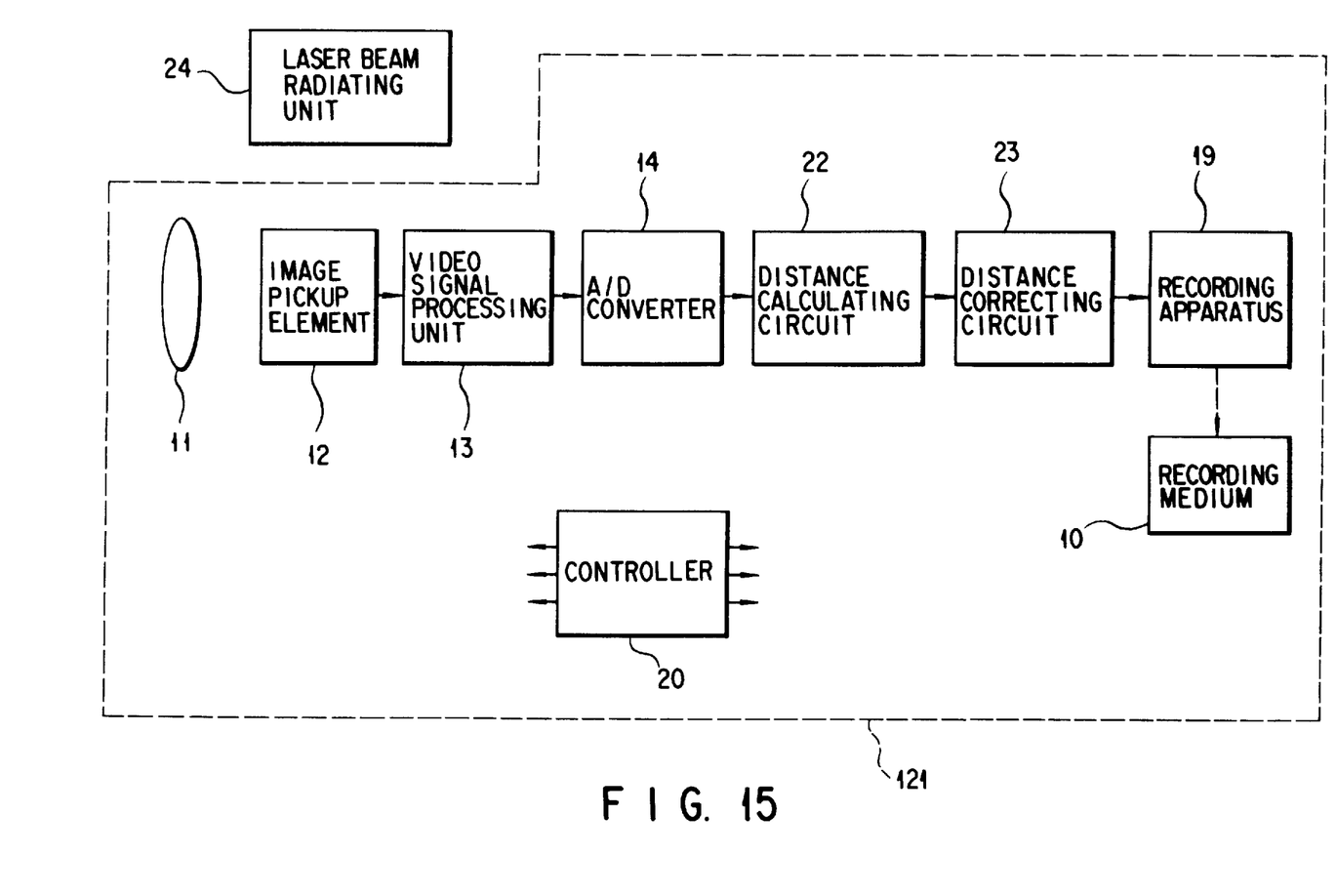
FIG. 15 is a block diagram showing an image fetching apparatus according to the fourth embodiment of the present invention.

FIG. 15 is a view showing the arrangement of the fourth embodiment of the present invention.

As shown in FIG. 15, an image pickup element 12 is arranged at a position opposite to a lens 11, and the image pickup element 12 is connected to a video signal processing unit 13. The video signal processing unit 13 is connected to a distance calculating circuit 22 through an A/D converter 14, and the distance calculating circuit 22 is connected to a distance correcting circuit 23. The distance correcting circuit 23 is connected to a recording apparatus 19. In addition, a laser beam radiating unit 24 and a controller 20 are arranged. A portion 121 surrounded by a broken line in FIG. 15 is the main body of an image pickup apparatus.

In the above arrangement, a laser beam from the laser beam radiating unit 24 is radiated on a flat surface or a paper surface. An image signal obtained by an image pickup operation and including the reflected light component of the laser beam is A/D-converted and sent to the distance calculating circuit 22, and calculation (to be described later) is performed. The image signal is sent to the distance correcting circuit 23, and the distance is corrected by the distance correcting circuit 23.

Distance calculation and distance correction will be described below with reference to FIGS. 16A, 16B, and 16C.

Figure 16A:
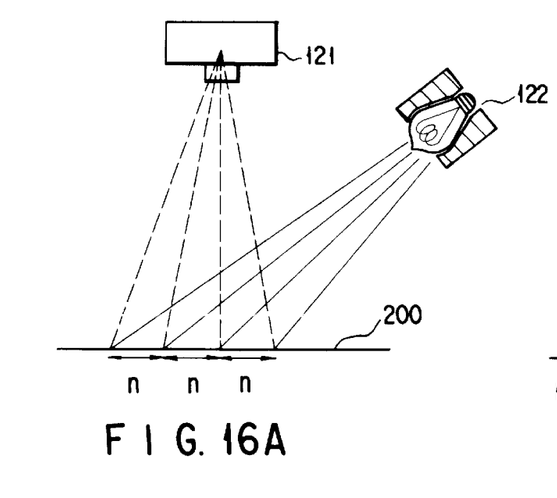
FIGS. 16A to 16C are views for explaining operations of the fourth embodiment of the present invention.

As shown in FIG. 16A, laser beams emitted from a light source 122 (corresponding to the laser beam radiating unit 24) are radiated on a flat surface 200 at equal intervals n. In this case, when a book is placed on the flat surface 200, the laser beams are radiated on a curved paper surface 201 of the book as shown in FIG. 16B.

Figure 16B:
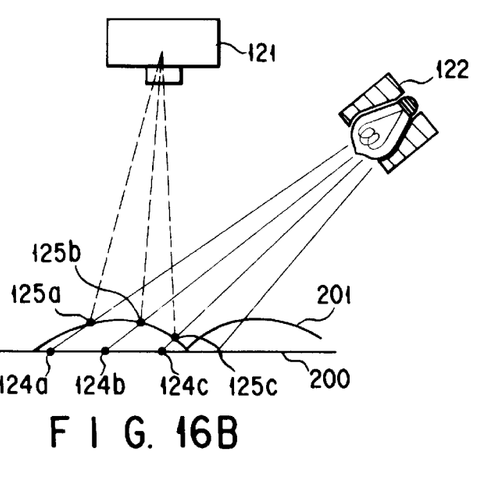

In FIG. 16B, points 124a, 124b, and 124c indicate positions, irradiated with the laser beams, on the flat surface 200, and points 125a, 125b, and 125c indicate positions, irradiated with the laser beams, on the curved paper surface 201.

Figure 16C:
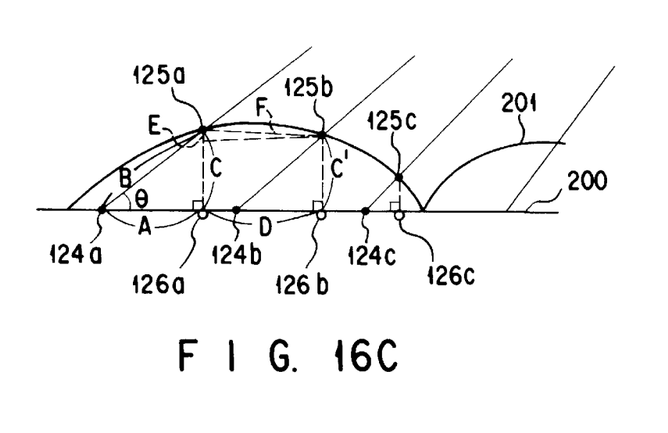

FIG. 16C is an enlarged view showing a part of FIG. 16B. In FIG. 16C, points 126a, 126b, and 126c indicate contact points obtained by drawing perpendiculars from the points 125a, 125b, and 125c to the flat surface 200.

As is apparent from FIGS. 16A to 16C, although the intervals between the three points 125a, 125b, and 125c on which the laser beams are radiated when an image pickup operation of the paper surface 201 is performed by the main body 121 over the paper surface 201 can easily be obtained, the intervals are not equal to each other. Therefore, an image pickup operation of the paper surface 201 of the book is performed while the laser beam is radiated on the paper surface 201 once, and an interval A between the point 126a and the point 124a, irradiated with the laser beams, on the flat surface 200 is calculated. An angle θ given by the three points, i.e., the point 125a, irradiated with the light beam, on the paper surface 201 and the points 124a and 126a, irradiated with the light beams, on the flat surface 200, is calculated by the position of the laser beam and positions irradiated with the laser beams.

An interval B between the points 124a and 125a and an interval C between the points 125a and 125a can be expressed as follows:

$$B \cos\theta = A \quad (1)$$

$$B \sin\theta = C \quad (2)$$

When B is eliminated from both the equations, the following equation is given:

$$A \tan\theta = C \quad (3)$$

In equation (3), since the interval A and the angle θ can be calculated in advance, substitutions of the values into equation (3) can yield a height C of the points 125a.

When the same calculation as described above is performed to the three points 124b, 125b, and 126b, a height C' of the point 125b can be calculated.

A distance D between the points 126a and 126b can be obtained in advance, and C–C'=E can be used. Therefore, an interval F between the points 125a and 125b can be expressed as follows:

$$F = (D^2 + E^2)^{1/2} \quad (4)$$

As is apparent from equation (4), as the interval D is decreased, the interval F is approximated by the distance between the points 125a and 125b. In this embodiment, the interval D is increased to the interval F to correct distortion of image data.

Although the laser beam is used in this embodiment, it is apparent that any light which can specify a position may be used.

As described above, in the image fetching apparatus according to the present invention, even when a spread of a thick book such as an encyclopedia is to be copied, characters of the gutter portion at the central portion of the book are not distorted, and the characters can be read without difficulty.

In addition, when character recognition is to be performed, fine recognition is performed at a portion which is near the central portion of the book and easily generates distortion, and coarse recognition is performed at a peripheral portion having small distortion, or the character recognition is performed in only a pre-determined direction, so that a circuit scale can be reduced.

According to the present invention, there is provided an image fetching apparatus capable of correcting the distortion to obtain a flat image, like an image on a flat surface, without distortion when an image pickup operation is to be performed to characters and the like which are distorted by a curved surface.

Additional embodiments of the present invention will be apparatus to those skilled in the art from consideration of the specification and practice of the present invention disclosed herein. It is intended that the specification and examples be considered as exemplary only, with the true scope of the present invention being indicated by the following claims.

What is claimed is:

1. An image pickup apparatus comprising:

image pickup means for picking up a target document image to output an electric signal;

converting means for converting the electric signal from said image pickup means into a digital signal to output image data having a plurality of pixels;

image reduction means for substantially reducing a size of an image in the image data by removing some of said plurality of pixels from the image data outputted from said converting means to output reduced image data;

control point coordinates generating means for generating coordinates of at least four control points in accordance with distortion information of the reduced image data from said image reduction means by using a neural network of said control point coordinates generating means which performs a learning operation as to generation of coordinates so as to obtain in advance control point coordinates concerning distortion of arbitrary original image data image data based on said control points being arranged in a matrix pattern relative to the original image data; and distortion correcting means for correcting distortion of the image data outputted from said converting means by position-converting said image data corresponding to each of the control points coordinates which are generated by said control point coordinates generating means, and by executing interpolation of image data defined by the control points in accordance with three control points from among said at least four control points.

2. An apparatus according to claim 1, wherein said apparatus further comprises:

an input image memory for storing the image data received from said converting means, and a reduced image memory for storing reduced image data received from said image reduction means.

3. An apparatus according to claim 1, wherein said apparatus further comprises a corrected image memory for storing corrected image data corrected by said distortion correcting means.

4. An apparatus according to claim 1, wherein said neural network performs learning with cross points of vertical and horizontal parallel lines as control points and outputs coordinate data of the control points.

5. An apparatus according to claim 4, wherein said neural network is a hierarchical neural network.

6. An apparatus according to claim 1, wherein said distortion correcting means converts the image data having a position corresponding to the control points, the coordinates of which are generated by said control point coordinates generating means, into image data divided in a lattice manner.

7. An image pickup apparatus comprising:

image pickup means for picking up a target document image to output an electric signal;

converting means for converting the electric signal from said image pickup means into a digital signal to output image data having a plurality of pixels;

image reduction means for substantially reducing a size of an image in the image data by removing some of said plurality of pixels from the image data outputted from said converting means to output reduced image data;

control point coordinates generating means for generating coordinates of at least four control points in accordance with distortion information of the reduced image data from said image reduction means by using a neural network of said control point coordinates generating means which performs a learning operation as to generation of coordinates so as to obtain in advance control point coordinates concerning distortion of arbitrary image data; and distortion correcting means for correcting distortion of the image data outputted from said converting means by position-converting said image data corresponding to each of the control points coordinates which are generated by said control point coordinates generating means, and by executing interpolation of image data defined by the control points in accordance with three control points from among said at least four control points;

wherein said distortion correcting means executes interpolation of the image data defined by the control points based on the following equations:

$$PiP = s \times PiPj + t \times PiPk$$

$$QiQ = s \times QiQj + t \times QiQk$$

where PiP, PiPj, PiPk, QiQ, QiQj and QiQk are vectors, Pi, Pj and Pk represent the coordinates of the three control points before the conversion, Qi, Qj and Qk represent the coordinates of the three control points after the conversion, s is a coefficient of the vectors PiPj and QiQj, and t is a coefficient of the vectors PiPk and QiQk.

8. An apparatus according to claim 7, wherein said apparatus further comprises:

an input image memory for storing the image data received from said converting means, and a reduced image memory for storing reduced image data received from said image reduction means.

9. An apparatus according to claim 7, wherein said apparatus further comprises a corrected image memory for storing corrected image data corrected by said distortion correction means.

10. An apparatus according to claim 7, wherein said neural network performs learning with cross points of vertical and horizontal parallel lines as control points and outputs coordinate data of the control points.

11. An apparatus according to claim 7, wherein said neural network is a hierarchical neural network.

12. An apparatus according to claim 7, wherein said distortion correcting means converts the image data having a position corresponding to the control points, the coordinates of which are generated by said control point coordinates generating means, into image data divided in a lattice manner.

13. An image pickup apparatus comprising:

image pickup means for picking up a target document image to output an electric signal;

converting means for converting the electric signal from said image pickup means into a digital signal to output image data having a plurality of pixels;

image reduction means for substantially reducing a size of an image in the image data by removing some of said plurality of pixels from the image data outputted from said converting means to output reduced image data;

control point coordinates generating means for generating coordinates of at least four control points in accordance with distortion information of the reduced image data from said image reduction means by using a neural network of said control point is coordinates generating means which performs a learning operation as to generation of coordinates so as to obtain in advance control point coordinates concerning distortion of arbitrary image data; and distortion correcting means for correcting distortion of the image data outputted from said converting means by position-converting said image data corresponding to each of the control points coordinates which are generated by said control point coordinates generating means, and by executing interpolation of image data defined by the control points in accordance with three control points from among said at least four control points;

wherein said neural network performs learning with cross points of vertical and horizontal parallel lines as control points and outputs coordinate data of the control points; and wherein said distortion correcting means converts the image data having a position corresponding to the control points, the coordinates of which are generated by said control point coordinates generating means, into image data divided in a lattice manner.

* * * * *